March 27, 1951  J. H. SUTHERLAND  2,546,876
HAND TRUCK, INCLUDING TILTING MEANS THEREFOR
Filed May 26, 1947
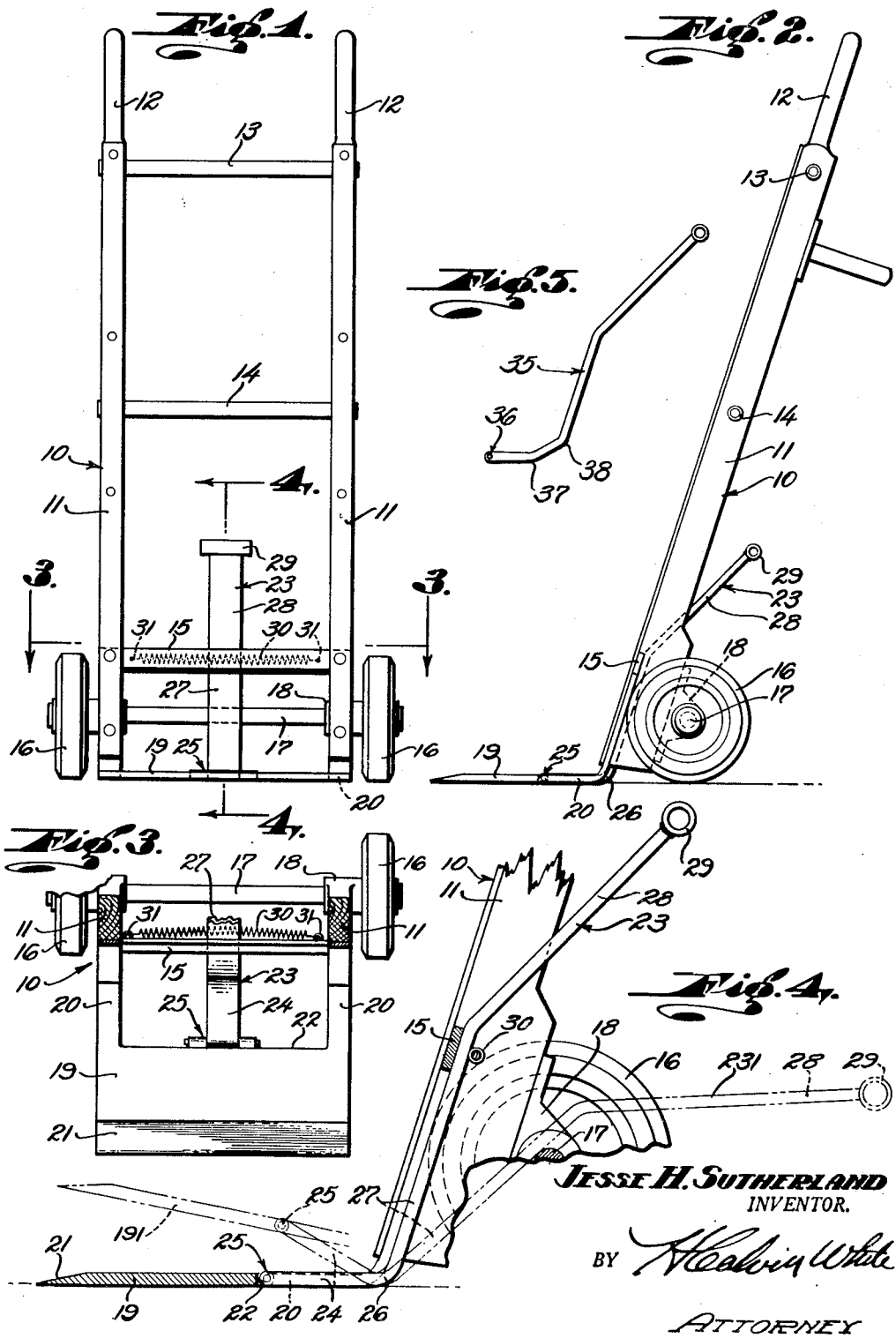
Jesse H. Sutherland
INVENTOR.
BY Calvin White
ATTORNEY Patented Mar. 27, 1951

2,546,876

UNITED STATES PATENT OFFICE 2,546,876

HAND TRUCK, INCLUDING TILTING MEANS THEREFOR

Jesse H. Sutherland, South Gate, Calif.

Application May 26, 1947, Serial No. 750,438

3 Claims. (Cl. 280—56)

This invention has to do generally with improvements in hand operated trucks of the stevedore type comprising a normally upstanding frame carried by a pair of wheels and having a forwardly projecting toe piece for reception beneath the load.

The invention has for its primary object to facilitate rearward tilting of the truck for assumption and displacement of its load in balanced position over the wheel axis, by a lever attachment characterized by its extreme simplicity and general adaptability to hand trucks of this type.

Particularly the invention aims to provide a novel fulcrum lever attached to the truck in a manner such that the lever may be foot operated to tilt the frame and toe piece rearwardly relative to the wheel axis and thus displace the load toward balanced position, with greater ease than normally is required where the wheel axis constitutes the fulcrum point. As will appear, the lever may become engageable with the wheel axle after initial displacement of the load to a position beyond which it may be easily moved to balanced condition with the axle serving as a secondary fulcrum for the lever.

Structurally, and in its preferred form, the lever may constitute a simple angular member hinged to the toe piece and extending rearwardly to a point of fulcrum engagement with the ground or floor surface, beyond which the lever extends upwardly in overlying relation to the axle and to a location for accessible foot operation. Suitable yielding means may be employed to return the lever to normal position following its release after the truck and load are tilted.

All the various features and objects of the invention, as well as the details of an illustrative embodiment, will be fully understood from the following description of the accompanying drawing, in which:

Fig. 1 is a view showing the truck in front elevation;

Fig. 2 is a side elevation;

Fig. 3 is a horizontal section on line 3—3 of Fig. 1;

Fig. 4 is a fragmentary enlarged view taken in the plane of line 4—4 in Fig. 1, illustrating different positions of the foot operated lever; and Fig. 5 shows a variational form of foot lever.

The invention is applicable generally to the illustrated type of two wheel hand trucks, the particular structural details of which may correspond with any of the known and commonly used designs. Typically the truck is shown to comprise a frame structure 10 including a pair of side members 11 terminating at the handles 12 and interconnected by cross members 13, 14 and 15. The wheels 16 are carried by an axle 17 extending through bearings 18 attached to the lower rear faces of the frame members 11. Referring particularly to Fig. 3, the truck includes a forwardly projecting toe plate 19 having arm portions 20 secured to the frame members 11. The particular form of toe plate illustrated has a downwardly beveled forward edge 21 and a rear edge 22 positioned forwardly of the plane of the truck frame.

The foot lever 23 is of angular formation, having a bottom horizontal portion 24 pivotally connected by hinge 25 with the rear edge 22 of the toe plate. From portion 24, the lever has a fulcrum bend 26 above which the intermediate portion 27 of the lever extends upwardly and rearwardly in front of the axle 17 to an upper portion 28 which may overlie the axle and carry an end piece 29 conveniently accessible to the operator's foot. Rearward swinging of the lever 23 relative to the frame 10 may be yieldably resisted in any suitable manner, as by a coil spring 30 bearing against the rear side of the lever and terminally secured to the frame member 15 at 31, as shown in Figs. 1 and 3.

In using the truck, the toe plate 19 is thrust beneath the load, with the frame 10 positioned as in Fig. 2. By exerting foot pressure on the lever end 29, the operator causes the lever to rock or fulcrum at its bend 26 on the ground or floor surface, and thus tilt the truck rearwardly about its axle by the lifting force transmitted by the lever to the toe plate through the hinge connection 25. Downward movement of the lever to its position of engagement with the axle 17, as illustrated by the broken lines 231 in Fig. 4, elevates the toe plate to a corresponding position 191, rocking the truck and its load rearwardly toward a position of ultimate balance with relation to the wheel axis. During such movement, lever 23 is of course swung back relative to the truck frame, against the resistance of spring 30. Continued foot pressure on the lever following its engagement with the wheel axle, results in further rearward tilting of the frame and its load to a position of balance over the axle. During this last interval of the lever operation, axle 17 becomes the fulcrum since the forward portion of the lever, including the bend 26, are raised from the ground. Following its release, the foot lever is returned by spring 30 to the normal solid line position of Fig. 4. The foot lever has an additional function in that it serves as a brake to prevent backing of the truck away from the load as force is applied thereto. The pressed engagement of the fulcrum 26 with the floor presents such resistance to movement of the truck as to maintain it against the load.

Fig. 5 illustrates a variational foot lever differing from the described form in that it is shaped to have two points of successive fulcrum engagement with the floor. Here the lever 35, to be hinged at 36 to the toe plate or other part of the structure, has two bends at 37 and 38, at the former of which the lever first fulcrums, to then fulcrum at 38 with an increased arm length relative to the toe plate, all in advance of the lever engagement with the axle 17.

I claim:

1. In a two wheel hand truck of the character described having a normally upstanding frame, an attached wheel carrying axle at the lower rear of the frame, and a toe piece projecting forwardly from and extending transversely of the bottom of the frame; the improvement comprising a rigid foot operated lever, and means pivotally connecting a front portion of said lever to the toe piece intermediate its ends and at a location forwardly of the plane of said frame, said lever extending rearwardly from its point of connection to the toe piece in the plane thereof when the toe piece rests on the truck-supporting surface and thence upwardly between the axle and the plane of the load carrying face of the truck, said upwardly extending portion of the lever terminating above the axle, said lever having fulcrum engagement with the ground at a location spaced rearwardly of said toe piece and being operable by downward foot pressure on its upwardly extending portion first to move downwardly relative to said axle to tilt the frame and toe piece rearwardly and then to engage the axle which then becomes a secondary fulcrum for the lever.

2. In a two wheel hand truck of the character described having a normally upstanding frame, an attached wheel carrying axle at the lower rear of the frame, and a toe piece projecting forwardly from and extending transversely of the bottom of the frame; the improvement comprising a one-piece foot operated lever, means pivotally connecting said lever to the rear central portion of said toe piece at a location forwardly of the plane of said frame, said lever extending rearwardly from its point of connection to the toe piece in the plane thereof when the toe piece rests on the truck-supporting surface and thence upwardly between the axle and the plane of the load carrying face of the truck, said upwardly extending portion of the lever terminating above the axle, the lever having fulcrum engagement with the ground at a location rearwardly of its point of connection to the toe piece and being operable by downward foot pressure on its upwardly extending portion to move downwardly relative to the frame and axle to tilt the frame and toe piece rearwardly and then to engage the axle, and yielding means engaging said lever and frame and resisting such movement of the lever relative to the frame.

3. A two wheel hand truck of the character described, comprising a normally upstanding frame, a toe piece projecting forwardly from and extending transversely of the bottom of the frame, and an angular rigid foot operated lever pivotally connected to said toe piece intermediate the ends of the toe piece and extending rearwardly in the plane thereof when the toe piece rests on the truck-supporting surface and thence upwardly between the axle and the plane of the load carrying face of the truck, said upwardly extending portion of the lever terminating above the axle, said lever having a portion in fulcrum engagement with the ground at a location rearwardly of the toe piece whereby downward foot pressure on the upwardly extending portion of the lever produces rearward tilting of the toe piece and frame.

JESSE H. SUTHERLAND.

REFERENCES CITED

The following references are of record in the file of this patent:

FOREIGN PATENTS

| Number | Country | Date |
|---|---|---|
| 599,923 | Atwood | Mar. 1, 1898 |
| 700,960 | Lynch | May 27, 1902 |
| 1,539,933 | Britton | June 2, 1925 |
| 2,392,955 | Stalcup | Jan. 15, 1946 |